United States Patent [19]

Swanson

[11] Patent Number: 5,003,703

[45] Date of Patent: Apr. 2, 1991

[54] ALIGNMENT INDICATOR FOR MACHINE TOOLS

[76] Inventor: Carl E. Swanson, 707 E. South St., Corry, Pa. 16407

[21] Appl. No.: 95,944

[22] Filed: Sep. 14, 1987

[51] Int. Cl.⁵ .............................................. G01B 13/19
[52] U.S. Cl. ...................................... 33/638; 33/391; 33/379; 33/520; 33/371
[58] Field of Search .................. 33/626, 628, 629, 630, 33/638, 644, 645, 642, 613, 365, 371, 370, 391, 379, 451, 520

[56] References Cited

U.S. PATENT DOCUMENTS

| 2,495,487 | 1/1950 | Germain | 33/638 |
| 3,200,508 | 8/1965 | Harper | 33/371 |
| 4,488,360 | 12/1984 | Steighner | 33/638 |

Primary Examiner—Harry N. Haroian
Attorney, Agent, or Firm—Ralph Hammar

[57] ABSTRACT

An indicator to be squeezed between the parts to be aligned in which the indication is provided by a level device associated with the indicator.

1 Claim, 1 Drawing Sheet

ALIGNMENT INDICATOR FOR MACHINE TOOLS

This invention is an indicator for the alignment of a cutting tool with a workpiece.

Figure 2:
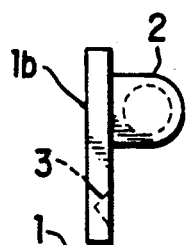
Figure 1:
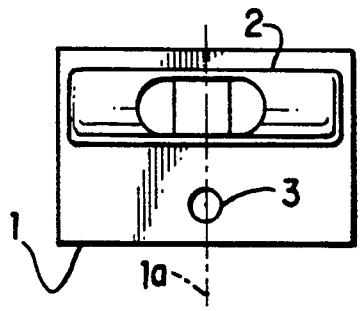
Figure 4B:
Figure 3:
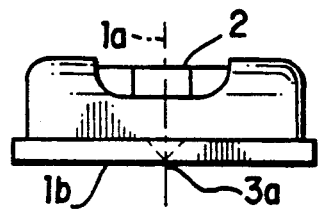
Figure 4A:
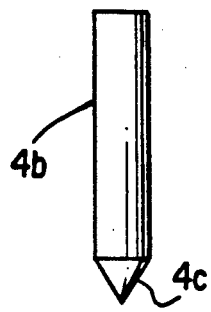
Figure 5:
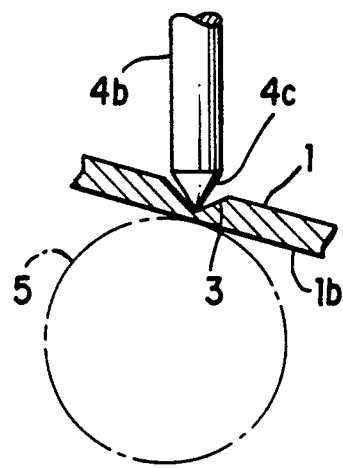
Figure 4:
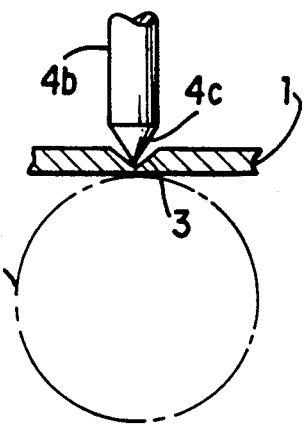
Figure 6:
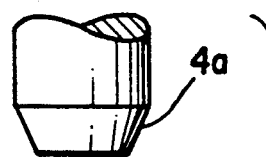
Figure 6:
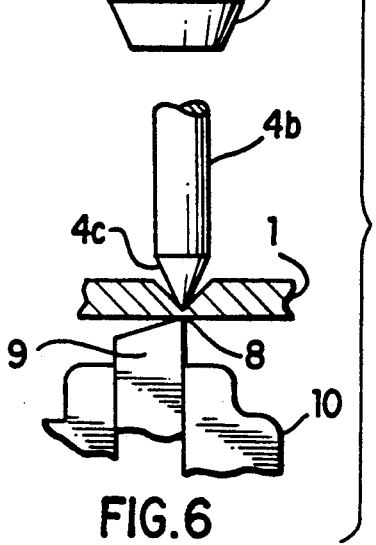

In the drawing, FIG. 1 is a top plan view of an alignment indicator, FIG. 2 is a side elevation, FIG. 3 is a front elevation, FIG. 4 is a view showing the indicator in perfect alignment with a workpiece, FIG. 4A is an elevation of a test pin, FIG. 4B is an end view of FIG. 4A, FIG. 5 is a similar view showing the tool out of line with the workpiece, and FIG. 6 is a view showing the tool in alignment with a longitudinal edge of the workpiece.

The indicator shown in FIGS. 1-6 has a rectangular plate 1 symmetrical about a longitudinal axis 1a and having a plane under surface 1b. On the upper side of the plate 1 is a spirit level 2 and a conical recess 3 spaced from each other along the axis 1a. A thin wall 3a separates the recess from surface 1b. The conical recess 3 is centered on the axis 1a. The spirit level 2 extends crosswise at right angles to the axis 1a and is centered on the axis 1a.

To use the indicator to check the alignment of a drill chuck or collet 4a with a cylindrical workpiece 5 a test pin 4b is inserted in the drill chuck 4a. The indicator is placed on the workpiece 5 with the longitudinal axis of the indicator in alignment with the longitudinal axis of the workpiece and with the recess 3 directly below the sharp point 4c of the test pin 4b. When the test pin is lowered, the point 4c is received in the recess 3 and beams on thin wall 3a as indicated in FIGS. 4, 5, 6 and the bubble of the spirit level 2 is centered. A drill substituted for the test pin 4b will drill through the centerline of the workpiece 5.

If the center line of the workpiece is out-of-line with the test pin 4b as shown in FIG. 5, lowering of the test pin causes tilting of the indicator which is shown quantitatively by the shifting of the bubble of the spirit level. Misalignment is corrected by shifting the workpiece. After the workpiece has been shifted to the condition shown in FIG. 4 the workpiece is properly aligned for machining.

The indicator shown in FIGS. 1-3 is also usable to locate the edge 8 of a workpiece 9 held in a vise 10 on the machine table When the edge 8 is in alignment with the axis 1a and recess 3, lowering of the test pin 4b causes the indicator 1 to be level as shown by the bubble of the spirit level 2. Shifting of the edge out of alignment with the recess 3 will cause tilting of the indicator 1 similar to that shown in FIG. 5. The indicator is also useful for checking a set-up for machining keyways.

The thin wall 3a increases the sensitivity and accuracy of the indicator.

I claim:

1. An indicator comprising a plate having a planar lower surface adapted to rest on a cylindrical workpiece with the longitudinal axis of the plate above and in alignment with the longitudinal axis of the workpiece, a conical recess in the upper surface of the plate and on the longitudinal axis of the plate for receiving a test pin with a sharp point separated from said lower surface by a thin wall on which the point bears, and means on said plate for indicating inclination of said plate due to misalignment of said pin with the longitudinal axis of the workpiece.

* * * * *